United States Patent [19]

Vesterlund

[11] 4,450,020
[45] * May 22, 1984

[54] METHOD OF MANUFACTURING CLADDING TUBES OF A ZIRCONIUM-BASED ALLOY FOR FUEL RODS FOR NUCLEAR REACTORS

[75] Inventor: Gunnar Vesterlund, Västeras, Sweden

[73] Assignee: Santrade Ltd., Lucerne, Switzerland

[ * ] Notice: The portion of the term of this patent subsequent to May 22, 2001 has been disclaimed.

[21] Appl. No.: 432,687

[22] Filed: Oct. 4, 1982

Related U.S. Application Data

[63] Continuation-in-part of Ser. No. 282,061, Jul. 10, 1981.

[30] Foreign Application Priority Data

Jul. 1, 1982 [SE] Sweden .............................. 8204072

[51] Int. Cl.³ .............................................. C22F 1/18
[52] U.S. Cl. ............................................... 148/11.5 F
[58] Field of Search ...................... 148/11.5 F, 12.7 B, 148/133, 407, 421; 420/422

[56] References Cited

U.S. PATENT DOCUMENTS 3,865,635  2/1975  Hofvenstam et al. ......... 148/11.5 F
3,963,534  6/1976  Frenkel .......................... 148/11.5 F

FOREIGN PATENT DOCUMENTS 58-71193  2/1983  Japan .............................. 148/11.5 F Primary Examiner—Peter K. Skiff
Attorney, Agent, or Firm—Burns, Doane, Swecker & Mathis

[57] ABSTRACT

In the manufacture of cladding tubes of a zirconium-based alloy for fuel rods for nuclear reactors by extrusion of the zirconium-based alloy and cold rollings of the extruded product with annealings, intermediate annealings, between the cold rollings and a $\beta$-quenching of the extruded product prior to the last cold rolling, a cladding tube is provided which has at the same time good corrosion properties and mechanical properties by performing the $\beta$-quenching prior to a cold rolling, after which an intermediate annealing is performed at a temperature of 500°–675° C., and preferably at a temperature of 500°–610° C. The zirconium-based alloy is a zirconium-tin alloy comprising 1.2–1.7% tin, 0.07–0.24% iron, 0.05–0.15% chromium and 0–0.08% nickel.

8 Claims, No Drawings

METHOD OF MANUFACTURING CLADDING TUBES OF A ZIRCONIUM-BASED ALLOY FOR FUEL RODS FOR NUCLEAR REACTORS

This is a continuation-in-part of application Ser. No. 282,061, filed July 10, 1981.

BACKGROUND OF THE INVENTION

The present invention relates to a method for manufacturing cladding tubes of a zirconium-based alloy for fuel rods for nuclear reactors.

As cladding tubes for fuel rods for nuclear reactors there are normally used thin-walled tubes of zirconium-based alloys, known under the name Zircaloy. These alloys contain alloying materials such as tin, iron and nickel. In Zircaloy the $\alpha$-phase is stable below 790° C., the $\beta$-phase is stable above 950° C., whereas a two-phase region, the $\alpha+\beta$-phase region, occurs between 790° C. and 950° C. In the $\alpha$-phase the zirconium atoms are arranged in a hexagonal close packed lattice and in the $\beta$-phase in a body centered cubic lattice. During so-called $\beta$-quenching of Zircaloy to bring about the desired properties such as improved corrosion properties of the material, the material is heated to a temperature in the $\beta$-phase region and rapidly cooled to a temperature in the $\alpha$-phase region.

During conventional manufacture of cladding tubes of Zircaloy, a $\beta$-quenching of the material is performed after forging of ingots into rods. After the manufacture of extrusion billets of the rods, the billets are extruded in the $\alpha$-phase region at a temperature of below 680° C., whereafter the extruded product is subjected to cold rolling in a number of steps and, between two consecutive cold rollings, an annealing, intermediate annealing, at 625°-700° C. to enable the subsequent cold rolling. After the last cold rolling step, a final annealing is performed to give the material the desired properties. The final annealing may be peformed at temperatures of 400°-700° C.

Tubes manufactured from Zircaloy under the conditions used so far have generally proved to possess sufficient resistance to corrosion under the operating conditions prevailing in a nuclear reactor. However, the development proceeds towards an increasingly higher utilization of the fuel, which means longer operating times for the fuel assemblies. The cladding material will therefore be subjected to the corrosive water for a longer period of time than what has been normal previously, which results in an increased risk of corrosion damage. It has therefore been a desire to achieve better corrosion properties in the alloys used without this involving unfavourable changes of the mechanical properties.

It is previously known, among other things from U.S. Pat. No. 4,238,251, that by $\beta$-quenching of a finished tube of Zircaloy it is possible to improve the resistance of the tube to so-called accelerated nodular corrosion in water and steam of high pressure. As will be clear form U.S. Pat. No. 3,865,635, tubes of Zircaloy having good mechanical properties may be achieved by $\beta$-quenching of the extruded product before this is subjected to the final cold rolling operation.

The exact reason for the improved resistance to accelerated nodular corrosion achieved by $\beta$-quenching has as yet not been completely established. It is considered, however, that the improvement is related to the size and distribution of the intermetallic compounds in the material. The intermetallic compounds, so-called second phases, consist of chemical compounds containing, besides zirconium, primarily the elements iron, chromium and nickel and they exist in the form of particles. The dissolution and precipitation process accomplished by the $\beta$-quenching results in a reduction of the size of the particles as well as in a redistribution from evenly distributed particles to particles constituting arrays at the grain boundaries of the $\alpha$-grains formed during the $\beta$-phase transformation.

A $\beta$-quenching of the finished cladding tube results in a reduction of the ductility of the tube, which involves a disadvantage with the method. A $\beta$-quenching of the extruded product prior to cold rolling into the final dimension gives less deterioration of the mechanical properties of the finished tube. A $\beta$-quenching, however, regardless of whether it takes place on a finished tube or prior to the final cold rolling step, results in an impaired yield because of the increased amount of scrap and further because of material losses since a $\beta$-quenching leads to the formation of an oxide layer on the surface of the tube, which must be removed.

According to the present invention, it has proved to be possible to manufacture cladding tubes for fuel rods for nuclear reactors having at least as good resistance to nodular corrosion as the best previously known cladding tubes and at the same time a better ductility than such cladding tubes. Compared with previously known methods of manufacturing cladding tubes while using $\beta$-quenching after the extrusion, using the present invention, which also includes $\beta$-quenching, results in an improved yield because of reduced scrap and further reduced material losses since the oxides formed can be removed on a smaller surface by performing the $\beta$-quenching in an earlier stage of the manufacturing process.

The invention relates to a method of manufacturing a cladding tube of a zirconium-based alloy as defined below for fuel rods for nuclear reactors, the zirconium-based alloy being extruded and the extruded product being subjected to cold rollings and at least one annealing, intermediate annealing, between two consecutive cold rollings and to a $\beta$-quenching prior to the final cold rolling, characterised in that the $\beta$-quenching is performed prior to a cold rolling, after which at least one intermediate annealing is performed at a temperature of 500°-675° C. The preferred temperature for the intermediate annealing is 500°-610° C., and the specially preferred temperature is 550°-600° C. The extrusion can be carried out at an arbitrary temperature in the $\alpha$-phase region.

After the last cold rolling, the extruded product is subjected to a final annealing at a temperature of 400°-675° C., preferably at a temperature of 400°-610° C. and especially preferably at a temperature of 550°-600° C.

The $\beta$-quenching of the extruded product is carried out by heating the product to a temperature in the $\beta$-phase region, suitably to a temperature of 950°-1250° C. and preferably to a temperature of 1000°-1150° C. and thereafter rapidly cooling it to a temperature in the $\alpha$-phase region. The cooling from the temperature used in the $\beta$-phase region to the temperature 790° C. then suitably takes place at a rate of 20°-400° C. per second and the cooling from 790° C. to 500° C. or a temperature therebelow suitably at a rate of more than 5° C. per minute.

In the manufacture of cladding tubes according to the present invention, it has proved that the size of the second phase particles in the finished cladding tube, as in the case where β-quenching is used, is considerably smaller than with conventional manufacture of cladding tubes without β-quenching after the extrusion. However, contrary to what is the case after β-quenching in previously known methods, the second phase particles are homogeneously distributed in the material. It is possible that it is the small size of the second phase particles achieved according to the present invention, together with the homogeneous distribution thereof, that gives the favourable combination of good resistance to nodular corrosion and good mechanical properties.

The zirconium-based alloy consists of a zirconium-tin alloy, whose contents of alloying material lie within the limits 1.2–1.7% for tin, 0.07–0.24% for iron, 0.05–0.15% for chromium and 0–0.08% for nickel, the balance being zirconium and any existing impurities of ordinary kind, the percentages stated, as well as other percentages stated in the application, referring to percentage by weight. The alloy comprises alloys known under the trade names Zircaloy 2 and Zircaloy 4. Zircaloy 2 contains 1.2–1.7% tin, 0.07–0.20% iron, 0.05–0.15% chromium, and 0.03–0.08% nickel. Zircaloy 4 contains 1.2–1.7% tin, 0.18–0.24% iron, 0.07–0.13% chromium and no nickel.

The zirconium-based alloy is preferably subjected to a β-quenching prior to the extrusion, that is, it is heated to a temperature in the β-phase region and rapidly cooled to a temperature in the α-phase region. However, it is possible to use the zirconium-based alloy without it being subjected to β-quenching. β-quenching prior to the extrusion is carried out by heating the alloy to a temperature of suitably 950°–1250° C. and of preferably 1000°–1150° C. and by rapidly cooling it to a temperature in the α-phase region. The cooling from the used temperature in the β-phase region to the temperature 790° C. then suitably takes place at a rate of 1°–50° C. per second and the cooling from 790° C. to 500° C. or a temperature therebelow suitably at a rate of more than 5° C. per minute.

The invention will be explained in greater detail by describing an example.

An ingot of Zircaloy 2 is forged into a rod with a dimension of 150–200 mm. the rod is subjected to β-quenching by heating it to a temperature of 1050° C. for 15 minutes and cooling it to room temperature at a rate of 5°–10° C./second. Extrusion billets are made from the rod. These billets are extruded at a temperature of 700°–740° C., that is, in the α-phase region. The extruded product is thereafter subjected to three cold rolling operations whereby the final outer diameter of the tube becomes 12.3 mm. Between the first and the second rolling the extruded product is subjected to a β-quenching by heating it to 1050° C. for a few seconds with a high frequency coil arranged around it, whereafter it is cooled at a rate of 200° C./second to room temperature by water spraying. Between the second and last rolling, the extruded product is annealed at a temperature of 575° C. After the last cold rolling, the tube is finally annealed at a temperature of 565° C. Both intermediate annealings and the final annealing may be carried out in an evacuated furnace. In the finished tube, the second phase particles have a size which is substantially in the interval 0.05–0.4 μm and a mean particle size of around 0.15 μm. In a cladding tube which has been manufactured in a conventional manner and which has not been subjected to β-quenching in finished state or earlier in extruded state, the second phase particles have a size which is substantially in the interval 0.1–0.6 μm and a mean particle size of about 0.3 μm.

During corrosion tests which have proved to simulate well the conditions in reactor operation, cladding tubes manufactured according to the present invention exhibit weight gain which is only a fraction of that which is obtained in conventional manufacture without the use of β-quenching after the extrusion and approximately as great as that obtained during manufacture while using β-quenching after the extrusion, 50–100 mg/dm$^2$ according to the invention and 350–4000 mg/dm$^2$ during conventional manufacture without the use of β-quenching. The ductility of a cladding tube manufactured according to the invention is better than with tubes which have been subjected to β-quenching in finished state and with tubes which have been subjected to β-quenching immediately prior to the last cold rolling.

The above-mentioned corrosion tests are performed in an autoclave with water vapour at a pressure of 9.8 MPa and a temperature of 500° C. The weight gain is a measure of the corrosion to which the tube has been subjected.

I claim:

1. A method of manufacturing cladding tubes of a zirconium-based alloy for fuel rods for nuclear reactors, said zirconium-based alloy containing 1.2–1.7 percent by weight tin, 0.07–0.24 percent by weight iron, 0.05–0.15 percent by weight chromium and 0–0.08 percent by weight nickel, the method comprising:
    (a) extruding the zirconium-based alloy into an extruded product;
    (b) subjecting the extruded product to a plurality of cold rollings;
    (c) prior to one of said cold rollings, subjecting the extruded product to β-quenching;
    (d) after said β-quenching and the associated cold rolling, subjecting the extruded product to an intermediate annealing at a temperature of 500° to 675° C.;
    (e) subjecting the extruded product to a final cold rolling; and
    (f) subjecting the extruded product to a final annealing.

2. A method according to claim 1, characterized in that the intermediate annealing is performed at a temperature of 500°–610° C.

3. A method according to claim 1, characterized in that the zirconium-based alloy is also β-quenched prior to the extrusion.

4. A method according to claim 2, characterized in that the extruded product is subjected to a final annealing at a temperature of 400°–675° C. after the last cold rolling.

5. A method according to claim 3, characterized in that the extruded product is subjected to a final annealing at a temperature of 400°–675° C. after the last cold rolling.

6. The method according to claim 1, characterized in that the intermediate annealing is performed at a temperature of 550°–600° C.

7. The method according to claim 1 characterized in that the final annealing is conducted at a temperature of 400°–610° C.

8. The method according to claim 1 characterized in that the final annealing is conducted at a temperature of 550°–600° C.

* * * * *

UNITED STATES PATENT AND TRADEMARK OFFICE
CERTIFICATE OF CORRECTION

PATENT NO. : 4,450,020
DATED : May 22, 1984
INVENTOR(S) : Gunnar Vesterlund et al.

It is certified that error appears in the above-identified patent and that said Letters Patent is hereby corrected as shown below:

On the title page, Item [75] Inventor: should read:

--- [75] Inventor: Gunnar Vesterlund, Vasteras, Sweden and Erik Thomas Anderson, Sandviken, Sweden ---.

Signed and Sealed this

Sixteenth Day of October 1984

[SEAL]

Attest:

GERALD J. MOSSINGHOFF

Attesting Officer

Commissioner of Patents and Trademarks